US012638305B2

(12) United States Patent
Kiyohara et al.

(10) Patent No.: US 12,638,305 B2
(45) Date of Patent: May 26, 2026

(54) MAP PROCESSING DEVICE AND MAP PROCESSING METHOD

(71) Applicant: Hitachi Astemo, Ltd., Hitachinaka (JP)

(72) Inventors: Masahiro Kiyohara, Tokyo (JP); Hiroki Ota, Tokyo (JP); Takeshi Ogata, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 166 days.

(21) Appl. No.: 18/278,871

(22) PCT Filed: Sep. 7, 2021

(86) PCT No.: PCT/JP2021/032793
§ 371 (c)(1),
(2) Date: Aug. 25, 2023

(87) PCT Pub. No.: WO2022/201588
PCT Pub. Date: Sep. 29, 2022

(65) Prior Publication Data
US 2025/0076077 A1      Mar. 6, 2025

(30) Foreign Application Priority Data

Mar. 26, 2021    (JP) ................................ 2021-054368

(51) Int. Cl.
*G01C 21/00*        (2006.01)
(52) U.S. Cl.
CPC ................................ *G01C 21/3844* (2020.08)
(58) Field of Classification Search
CPC ................................................ G01C 21/3844
See application file for complete search history.

(56) References Cited

U.S. PATENT DOCUMENTS

| | | | | |
|---|---|---|---|---|
| 9,612,341 | B2 * | 4/2017 | Large | ...................... G01S 19/43 |
| 2019/0033465 | A1 * | 1/2019 | Kido | ...................... G01S 19/40 |
| 2021/0286087 | A1 * | 9/2021 | Yoshida | ................ G01C 21/28 |

FOREIGN PATENT DOCUMENTS

| | | |
|---|---|---|
| JP | 2009-42106 A | 2/2009 |
| JP | 2017-9429 A | 1/2017 |

(Continued)

OTHER PUBLICATIONS

International Search Report (PCT/ISA/210) issued in PCT Application No. PCT/JP2021/032793 dated Oct. 19, 2021 with English translation (4 pages).

(Continued)

*Primary Examiner* — Adnan M Mirza
(74) *Attorney, Agent, or Firm* — Crowell & Moring LLP

(57)        ABSTRACT

A problem to be solved by the present invention is that a host vehicle position calculated on the basis of a GNSS is affected by shielding, reflection, diffraction, and the like of a positioning radio wave due to a structure, depending on a structure environment present around a receiver and an arrangement of positioning satellites at the date and time, and a detected measured position is output in a biased manner. A map processing device 10 of the present invention processes map information used for positioning a host vehicle, and includes: a satellite orbit information acquisition unit 103 that acquires position information of a plurality of positioning satellites; a pseudo distance acquisition unit 102 that calculates a pseudo distance from the plurality of positioning satellites based on positioning radio waves respectively received from the plurality of positioning satellites; a positioning available satellite verification unit 104 that identifies, among the plurality of positioning satellites, a positioning satellite for which a distance to the host vehicle position and the pseudo distance do not match as a positioning unavailable satellite; and a map generation unit 106

(Continued)

that generates a map in which a direction from the host vehicle position to the positioning unavailable satellite is stored in association with the host vehicle position as a shielded range in which a positioning radio wave from the positioning unavailable satellite is shielded.

5 Claims, 11 Drawing Sheets

(56)                    References Cited

FOREIGN PATENT DOCUMENTS

| | | |
|---|---|---|
| JP | 2020-12650 A | 1/2020 |
| WO | WO 2017/154779 A1 | 9/2017 |

OTHER PUBLICATIONS

Japanese-language Written Opinion (PCT/ISA/237) issued in PCT Application No. PCT/JP2021/032793 dated Oct. 19, 2021 (4 pages).

* cited by examiner

O  NODE
—  LINK

Figure 9:
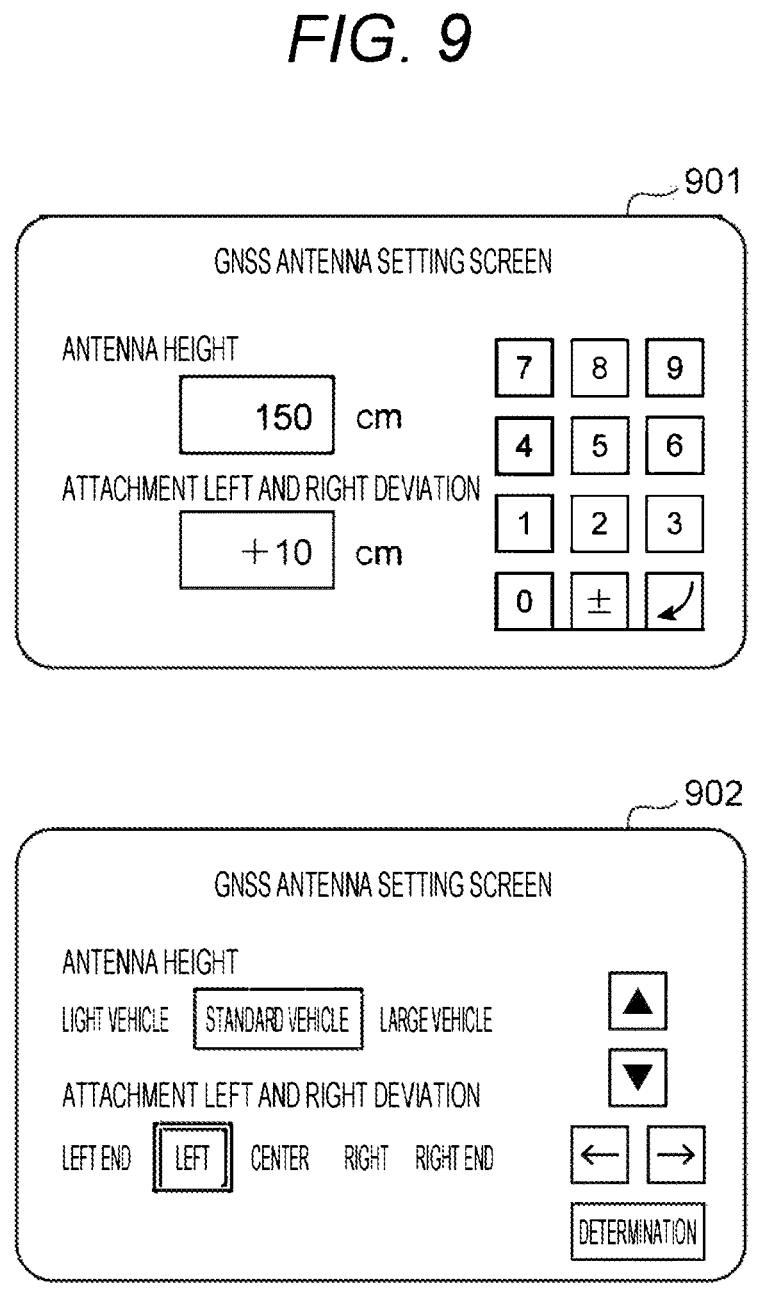

GNSS ANTENNA SETTING SCREEN

ANTENNA HEIGHT 150 cm

| 7 | 8 | 9 |
| 4 | 5 | 6 |
| 1 | 2 | 3 |
| 0 | ± | ↵ |

ATTACHMENT LEFT AND RIGHT DEVIATION

+10 cm

902

GNSS ANTENNA SETTING SCREEN

ANTENNA HEIGHT

LIGHT VEHICLE   STANDARD VEHICLE   LARGE VEHICLE

ATTACHMENT LEFT AND RIGHT DEVIATION

LEFT END   LEFT   CENTER   RIGHT   RIGHT END

▲

▼

←  →

DETERMINATION

FIG. 10

| | | | RELIABILITY INDEX |
|---|---|---|---|
| DEALER OPTION, ACCESSORY PURCHASED LATER | | | 2 |
| MANUFACTURER OPTION | CAR MANUFACTURER A | INEXPENSIVE VEHICLE TYPE | 4 |
| | | EXPENSIVE VEHICLE TYPE | 5 |
| | CAR MANUFACTURER B | INEXPENSIVE VEHICLE TYPE | 5 |
| | | EXPENSIVE VEHICLE TYPE | 6 |
| SURVEYING VEHICLE | | | 10 |

MAP PROCESSING DEVICE AND MAP PROCESSING METHOD

TECHNICAL FIELD

The present invention relates to a map processing device and a map processing method used when a mobile object traveling while performing satellite positioning observes a surrounding environment structure and accumulates information thereof or performs self-position estimation using the accumulated information.

BACKGROUND ART

Conventionally, when the mobile object traveling while performing satellite positioning performs the self-position estimation, a host vehicle position that changes from moment to moment is calculated by combining the satellite positioning and autonomous navigation, and obtaining a relative amount moved from a positioning timing using the autonomous navigation with a latitude, longitude, and altitude at discrete time obtained by the satellite positioning as a reference. The satellite positioning calculates the latitude and longitude of a receiving station based on arrival times of positioning radio waves from a plurality of positioning satellites. For example, in recent years, in addition to GPS in the United States, various countries have launched positioning satellites such as GLONASS in Russia, Galileo in Europe, Beidou in China, and QZSS in Japan, and highly accurate satellite positioning has become possible by combining such a large number of positioning satellites. In addition, when combining results of the satellite positioning and the autonomous navigation, a measure for suppressing positional deviation caused by sudden noise using a filtering processing such as Kalman filtering has been employed.

Furthermore, when the satellite positioning is performed, there is a problem that satellite radio waves are shielded by surrounding structures or the like present in an urban area, and accuracy of the self-position estimation is reduced. As a technique for improving this problem, a technique has been proposed in which a satellite shielded area map indicating an area where the satellite radio waves are shielded is calculated from an arrangement of structures around a travel route, and the travel route is controlled using the satellite shielded area map, thereby performing travel control of the host vehicle while maintaining the accuracy of the self-position estimation.

For example, in PTL 1, paragraph 0015 is connected to "the map information storage memory 7 is storage means for storing road map information in advance", and it is described in paragraph 0023 that "information of the surrounding structures (building, tunnel, elevated, and the like) 22 is also included" in the road map information. It is disclosed that using the road map information "generate the satellite shielded area map representing area (satellite shielded area) in which GPS satellite is shielded by the surrounding structures for a travel route candidate from current position of the host vehicle to destination using estimated future orbit coordinates of each GPS satellite" using the road map information. That is, PTL 1 discloses that a shielding situation of each positioning satellite is geometrically calculated at each point on the travel route using a map (3D map) with 3D information and the travel route, and this is used as the satellite shielded area map. In addition, PTL 1 discloses that the travel route and a stop position are selected on the basis of the satellite shielded area map so as to avoid an area where the positioning satellite is shielded.

CITATION LIST

Patent Literature

PTL 1: JP 2009-042106 A

SUMMARY OF INVENTION

Technical Problem

However, in the above-described conventional technique, the presence or absence of shielding of the positioning satellite is determined on the basis of the 3D map in which information of the surrounding structures is stored, the travel route and the stop position that can avoid an adverse effect by the structures are only selected, it is not possible to cope with a case where there is no plurality of selectable travel route candidates, and this does not contribute to improvement itself of accuracy of the satellite positioning.

In a global navigation satellite system (GNSS) used in an automatic driving system, a detected measured position is output in a biased manner depending on a structure environment such as a building present around a receiver and an arrangement of the positioning satellites at the date and time. However, when the structure environment is known and it is known that the positioning radio waves are affected by shielding, reflection, diffraction, and the like due to the structures, it is possible to reduce an error in the measured position by performing positioning calculation while excluding a satellite radio wave from an affected positioning satellite.

In view of such a problem, an object of the present invention is to reduce the error in the measured position and improve the accuracy of the self-position estimation by learning at each point a state in which the positioning radio waves are affected by the structure.

Solution to Problem

In order to solve the above problems, a map processing device of the present invention is a map processing device that processes map information used for positioning a host vehicle, the map processing device including: a satellite orbit information acquisition unit that acquires position information of a plurality of positioning satellites; a pseudo distance acquisition unit that calculates a pseudo distance between the plurality of positioning satellites and a host vehicle position based on positioning radio waves respectively received from the plurality of positioning satellites; a positioning available satellite verification unit that identifies, among the plurality of positioning satellites, a positioning satellite for which a distance to the host vehicle position and the pseudo distance do not match as a positioning unavailable satellite that cannot be used for positioning the host vehicle; and a map generation unit that generates a map in which a direction from the host vehicle position to the positioning unavailable satellite is stored in association with the host vehicle position as a shielded range in which a positioning radio wave from the positioning unavailable satellite is shielded.

Advantageous Effects of Invention

According to the map processing device and the map processing method of the present invention, it is possible to reduce the error in the measured position and improve the accuracy of the self-position estimation by learning at each point the state in which the positioning radio waves are affected by the structure. Further features related to the present invention will be apparent from the description of the present specification and the accompanying drawings. Further, problems, configurations, and effects other than those described above will be clarified by the following description of embodiments.

BRIEF DESCRIPTION OF DRAWINGS

FIG. 4 is a schematic diagram illustrating a boundary of an obstacle and shielding of satellite radio waves when the satellites are observed at a plurality of points.

FIG. 9 is a schematic diagram illustrating an example of a setting screen displayed on a display device.

FIG. 10 is a table illustrating a setting example of reliability indexes.

DESCRIPTION OF EMBODIMENTS

Hereinafter, an embodiment of the map processing device according to the present invention will be described with reference to the drawings.

First Embodiment

Figure 1:
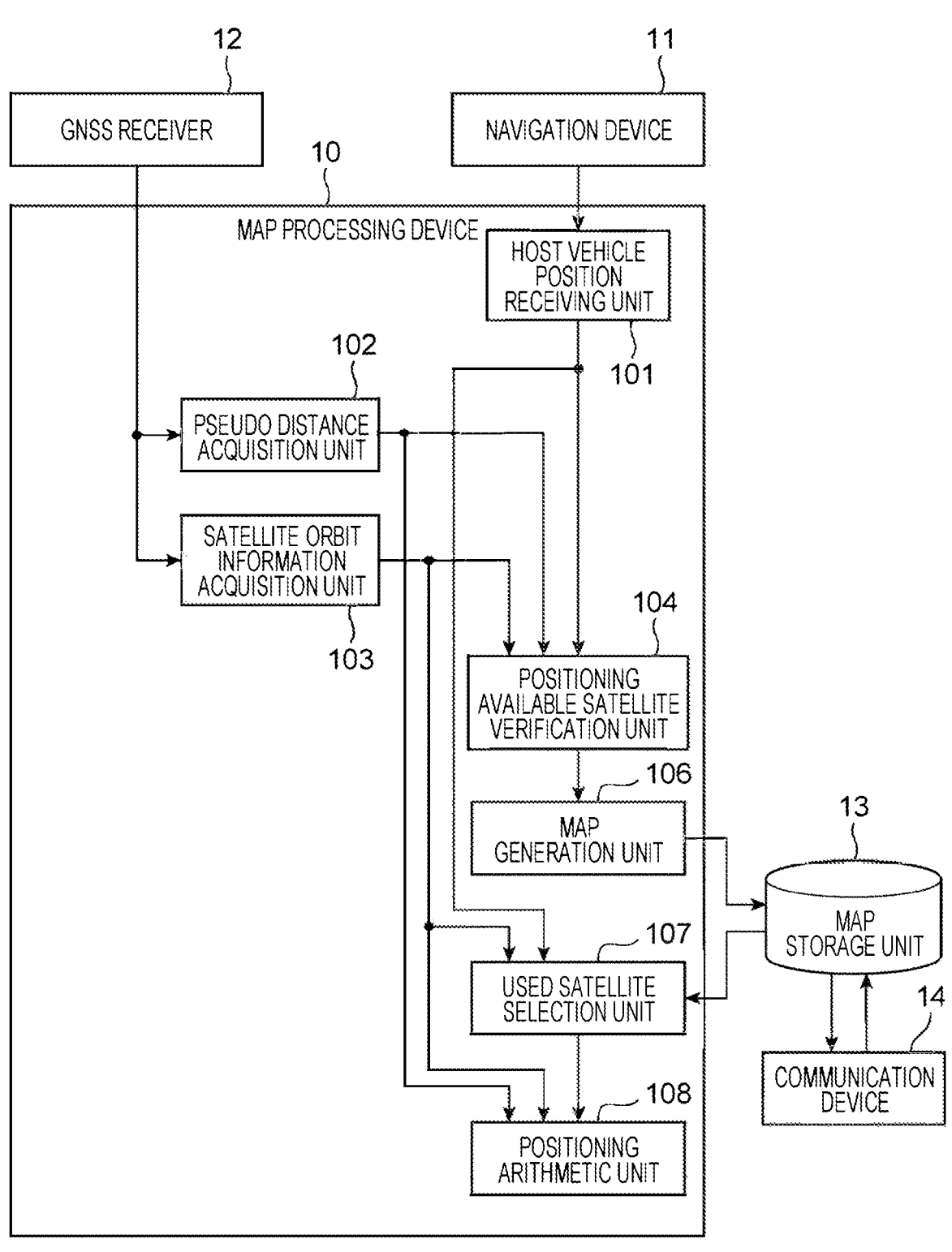
FIG. 1 is a configuration diagram illustrating a connection relationship between functional blocks according to a first embodiment.

FIG. 1 is a block diagram illustrating a map processing device 10 according to a first embodiment of the present invention.

The map processing device 10 is connected to a navigation device 11, a GNSS receiver 12, and a map storage unit 13, and has a configuration capable of transmitting and receiving contents of the map storage unit 13 to and from an outside via a communication device 14. The map processing device 10 is mounted on an automatic driving vehicle that performs automatic driving. The map processing device 10 includes a host vehicle position receiving unit 101 that receives a host vehicle position from the navigation device 11, and includes a pseudo distance acquisition unit 102 that receives information on positioning satellites from the GNSS receiver 12, and a satellite orbit information acquisition unit 103. Then, the map processing device 10 further includes: a positioning available satellite verification unit

104 that verifies whether a satellite can be used for positioning on the basis of each piece of positioning satellite information and host vehicle position information; and a map generation unit 106 that determines whether the satellite is shielded on the basis of an arrangement of positioning satellites (positioning unavailable satellites) that cannot be used for positioning, estimates an arrangement of shielding objects from shielding determination results at a plurality of observation points, and generates a 3D map. Then, the map processing device 10 further includes: a used satellite selection unit 107 that selects a positioning satellite that is less affected by shielding, diffraction, and reflection and is to be used for positioning calculation based on the 3D map and the host vehicle position; and a positioning arithmetic unit 108 that performs the positioning calculation based on information of a selected positioning satellite. It is assumed that the positioning arithmetic unit 108 has a function of sending a calculation result to an automatic driving unit of a host vehicle (not illustrated).

Note that, in the first embodiment, the map processing device 10, the navigation device 11, the GNSS receiver 12, the map storage unit 13, and the communication device 14 are separately described, but one or more of them may be mounted on the same hardware, and any one or more of the navigation device 11, the GNSS receiver 12, the map storage unit 13, and the communication device 14 may be included inside the map processing device 10.

Note that the map processing device 10 is specifically an electronic control unit (ECU) including hardware such as an arithmetic device such as a CPU, a main storage device such as a semiconductor memory, an auxiliary storage device, and a communication device, and the arithmetic device executes a program loaded in the main storage device to implement each function of the positioning arithmetic unit 108 and the like, but hereinafter, details of each unit will be described while appropriately omitting such a well-known technology in the computer field.

<Host Vehicle Position Receiving Unit 101>

The navigation device 11 is a device that calculates a travel route for moving from a certain point to another point on the basis of a map in which point coordinates (nodes), inter-point distances, and connection information (links) are stored, collates a current location point with the travel route, indicates a direction to be traveled at a road branch at any time, and recalculates the travel route when the host vehicle deviates from the calculated travel route to propose a new travel route. The host vehicle position receiving unit 101 has a function of receiving the travel route and the current location point from the navigation device 11.

Figure 2:
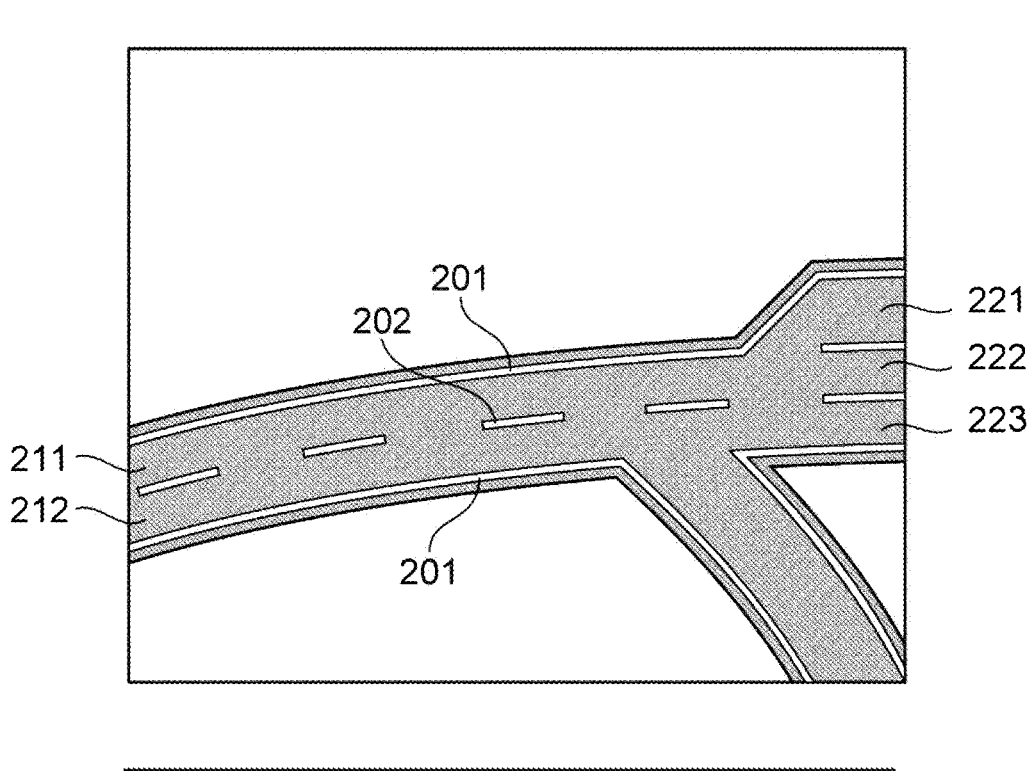
FIG. 2 is a schematic diagram illustrating a correspondence relationship between a road environment and nodes and links.
Figure 2:
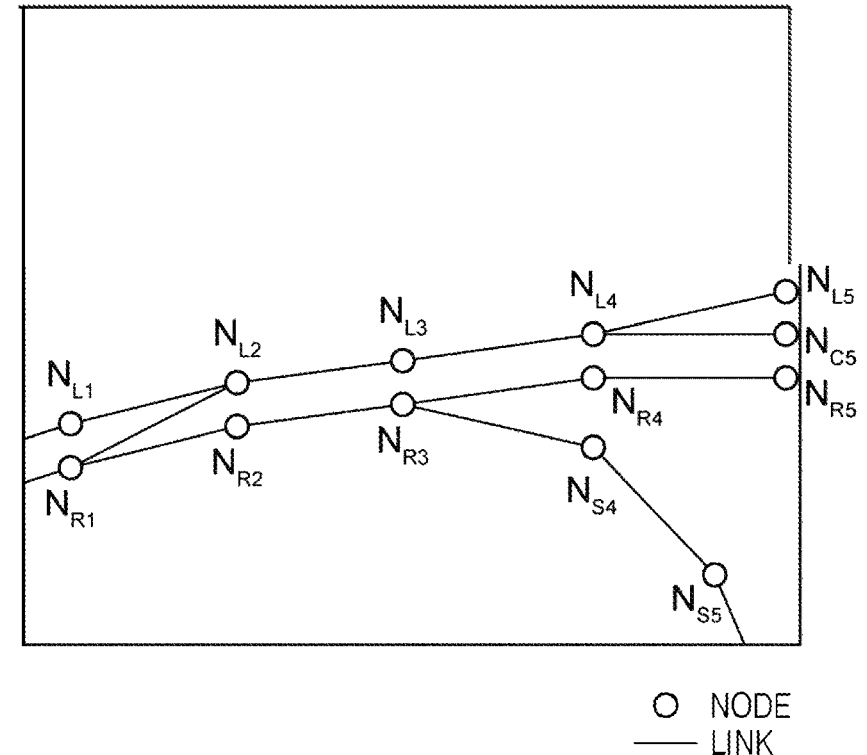

The travel route here refers to the nodes and the links in a map corresponding to a road on which the host vehicle has traveled and a road on which the host vehicle is scheduled to travel. Note that, as illustrated in FIG. 2, the map stores node point data storing coordinates such as latitude, longitude, and altitude at points at appropriate intervals of about several meters to several tens of meters in addition to a point at which a route may diverge, such as an intersection or a T-junction, and a point at which the number of lanes increases and decreases, and further, for example, when there is a road on which the host vehicle can move from a certain point A to another point B, the map stores link data storing a connection relationship existing between a node point A corresponding to the point A and a node point B corresponding to the point B, a connection relationship regarding a lane change at a place where the number of lanes increases and decreases, and the like.

In addition, the current location point here includes at least one or more of a last node point through which the host vehicle has passed in the map, one or more node points through which the host vehicle may pass next in the map, a link corresponding to a road on which the host vehicle is currently traveling, a traveling ratio on the link corresponding to the road on which the host vehicle is currently traveling, latitude, longitude, and altitude on which the host vehicle is currently traveling, and a traveling direction and speed.

The host vehicle position receiving unit 101 acquires information on the travel route and the current location point from the navigation device 11, predicts a future travel position on the basis of the information, and calculates an arrival time or an expected arrival time of a node point through which the host vehicle may pass in the future. Then, the current location point, the node point data, and the time are output to the positioning available satellite verification unit 104 or the used satellite selection unit 107.

<Pseudo Distance Acquisition Unit 102>

The GNSS receiver receives a positioning radio wave from the positioning satellite and identifies and tracks the code to acquire various satellite information including a carrier phase, a Doppler frequency, signal strength, satellite orbit information, and an ionospheric delay amount. Time information at which the positioning satellites have transmitted the positioning radio waves is superimposed on the information thus acquired, and by analyzing arrival times of satellite information of four or more positioning satellites in principle and further more positioning satellites in practical use, it is possible to calculate the latitude, longitude, and altitude of a receiver antenna and a time on the receiver side, and further, it is possible to calculate a pseudo distance on the basis of a transmission time of the positioning radio wave of each satellite and the time on the receiver side. In this way, the position of the receiver antenna at each time is calculated, and the position of the vehicle is calculated based on a vehicle mounting position of the receiver antenna. In addition, estimation of the host vehicle position and attitude by the GNSS receiver is performed at a high frequency, and for example, a positioning interval of a GNSS is often about 0.1 seconds to 1 second, but it can be said that the update cycle of this positioning interval is sufficiently fast for a route guidance function of an automatic driving system.

At this time, if there is a shielding object between the positioning satellite and the receiver antenna or there is a structure in the vicinity, the positioning radio wave of the positioning satellite propagates a distance longer than a distance between the positioning satellite and the receiver antenna due to influence of shielding, diffraction, and reflection, and pseudo distance data calculated based on the transmission time and reception time of the positioning radio wave becomes longer for the positioning satellite. That is, the pseudo distance is longer that an actual distance. The pseudo distance acquisition unit 102 acquires the pseudo distance data from each satellite and the reception time from the GNSS receiver 12.

Note that it is also possible to adopt a system configuration similar to that of the GNSS with respect to a pseudolite (pseudo satellite), a beacon, or the like installed mainly in an area where the radio wave from the positioning satellite is difficult to reach or indoors, and thus the positioning satellite described above can be read as a pseudo satellite signal transmitter and can be handled in a similar manner.

<Satellite Orbit Information Acquisition Unit 103>

Similarly to the pseudo distance acquisition unit 102, the satellite orbit information acquisition unit 103 acquires the satellite orbit information from each satellite and the reception time from the GNSS receiver 12. It is assumed that the reception time is synchronized with the reception time acquired by the pseudo distance acquisition unit 102. In addition, the acquired satellite orbit information may be converted into a coordinate system that can be easily used in calculation at a subsequent stage.

<Positioning Available Satellite Verification Unit 104>

The positioning available satellite verification unit 104 verifies whether a satellite can be used for positioning on the basis of each piece of positioning satellite information and the host vehicle position information, on the basis of an output from the host vehicle position receiving unit 101, an output from the pseudo distance acquisition unit 102, and an output from the satellite orbit information acquisition unit 103. Although not illustrated, the expression "verification" here means that there is a possibility that the navigation device 11 uses an output from the GNSS receiver 12 for the host vehicle position obtained from the host vehicle position receiving unit 101, there is a possibility that the host vehicle position is calculated using each piece of inappropriate positioning satellite information that reduces positioning accuracy when used for positioning, and the verification is because the positioning available satellite verification unit 104 further determines whether each piece of positioning satellite information should be used for positioning.

Figure 3:
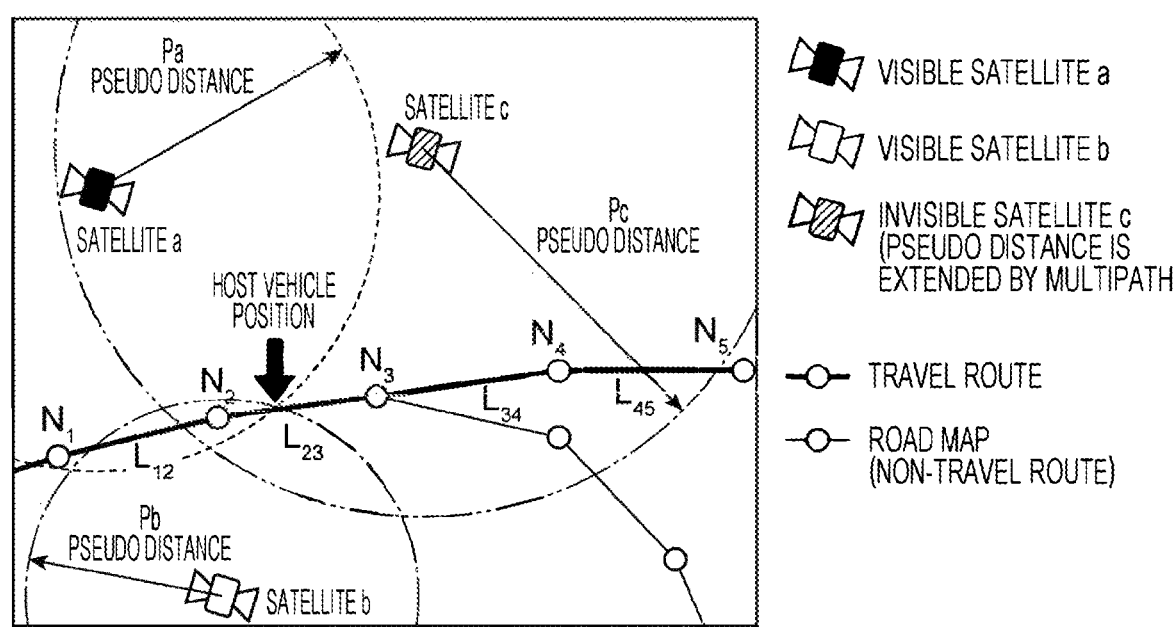
FIG. 3 is an explanatory diagram illustrating a relationship between a positioning satellite and a pseudo distance, and a node and a link near a host vehicle position when the measured position is calculated from a plurality of positioning satellites.

A state of this verification will be described with reference to FIG. 3. FIG. 3 is a diagram schematically illustrating a state in which three positioning satellites are present around the host vehicle when the host vehicle is traveling on a certain route, and is drawn in a planar manner for simplification although it should be drawn in three dimensions. Here, since the positioning radio waves directly reach the host vehicle from satellites a and b, they are in a visible positional relationship, and when a circle centered on each satellite and having a pseudo distance as a radius is drawn, it can be seen that the host vehicle position is on a circumference of the circle. On the other hand, it can be seen from a satellite c that the pseudo distance is longer than a linear distance between the satellite and the host vehicle due to reflection and diffraction by an obstacle.

Output information is obtained from the host vehicle position receiving unit 101 that node points {N1, N2, N3, N4, N5} of the travel route are respectively passed at times {tb2, tb1, ta1, ta2, ta3}. Here, b of tb means Before, and a of ta means After. In addition, it is assumed that output information indicating that the current host vehicle position is on a link L23 is also obtained.

In addition, it is assumed that the pseudo distances from the satellite a, the satellite b, and the satellite c are respectively obtained as Pa, Pb, and Pc from the pseudo distance acquisition unit 102. It is assumed that respective three-dimensional positions of the satellite a, the satellite b, and the satellite c are obtained from the satellite orbit information acquisition unit 103.

At this time, it is verified whether information that the host vehicle position is on the link L23 matches information of the three-dimensional position and the pseudo distance of each satellite. This can be performed, for example, by drawing a circle having the three-dimensional position of the satellite as the center and the pseudo distance as the radius, and determining whether the circumference intersects the link of the host vehicle position. In FIG. 3, since the circle of the pseudo distance Pa intersects the link L23 around the satellite a, the pseudo distance to the host vehicle position is matched, and it is determined that the pseudo distance Pa obtained from the satellite a can be used for positioning. It is determined that the satellite b can also be used for positioning. Since the circle of the pseudo distance Pc does not intersect the link L23 around the satellite c, the satellite c is observed as the pseudo distance longer than an original pseudo distance, and the pseudo distance to the host vehicle position is not matched, and thus it is determined that the satellite c cannot be used for positioning.

This determination method is useful for identifying a range in which a positioning satellite that can be used for observation is present at each point when where the host vehicle is traveling is known, such as, for example, the automatic driving system, a mobile system that goes around a specific course, and a mobile object that travels manually on a designated route.

Note that in the above description, it is described that whether the circumference having the pseudo distance as the radius intersects the link of the host vehicle position is determined, however, it is also possible to select a determination method such as determining whether the circumference intersects the link of the host vehicle position within an error range considering the error range of a predetermined width in the pseudo distance, determining whether the circumference having the pseudo distance as the radius intersects in the range of one or more links before and after the link of the host vehicle position, and determining whether the circumference having the pseudo distance as the radius intersects a passing link at a predetermined time range in addition to the current time, or to switch between these determination methods depending on the traveling area and the traveling time.

The positioning available satellite verification unit 104 searches for an intersection of the pseudo distance from the positioning satellite on a route link near the host vehicle position by using a least squares method, and calculates an error of the pseudo distance from the intersection. Then, the positioning available satellite verification unit 104 determines that the host vehicle and the positioning satellite are in the visible positional relationship when a difference between a distance connecting the host vehicle position and a position of the positioning satellite and the pseudo distance is within a predetermined error range. The positioning available satellite verification unit 104 can calculate a distance between a plurality of positioning satellites and the host vehicle position as a calculated distance on the basis of the position information of the plurality of positioning satellites and position information of the host vehicle, and identify, as the positioning unavailable satellite, a positioning satellite in which a difference between the calculated distance and the pseudo distance is equal to or larger than a threshold.

<Map Generation Unit 106>

The map generation unit 106 has a function of determining that the satellite direction is shielded from the host vehicle position for the satellite determined by the positioning available satellite verification unit 104 to be unavailable for positioning, and further has a function of generating a map relating to a shielded space and outputting the map to the map storage unit 13. The map generation unit 106 performs processing of storing a range including an azimuth angle and an elevation angle from the host vehicle position toward the positioning unavailable satellite as a shielded azimuth angle range and a shielded elevation angle range in association with the host vehicle position.

In FIG. 3, in a case where the positioning satellite c cannot be used for positioning at the host vehicle position, the azimuth angle and the elevation angle of the satellite c can be calculated from the output from the satellite orbit information acquisition unit 103. Furthermore, since current position of the host vehicle in the map is obtained from the host vehicle position receiving unit 101, it is possible to calculate the azimuth angle (shielded azimuth angle) and the elevation angle (shielded elevation angle) at which there may be a positioning satellite (positioning unavailable satellite) that cannot be used for positioning for each position. Note that instead of directly using values of the azimuth angle and the elevation angle of the positioning satellite, predetermined margin widths may be respectively set for the azimuth angle and the elevation angle, and the shielded azimuth angle range and the shielded elevation angle range may be calculated by giving ranges to the azimuth angle and the elevation angle at which there may be the positioning satellite that cannot be used for positioning.

Figure 4:
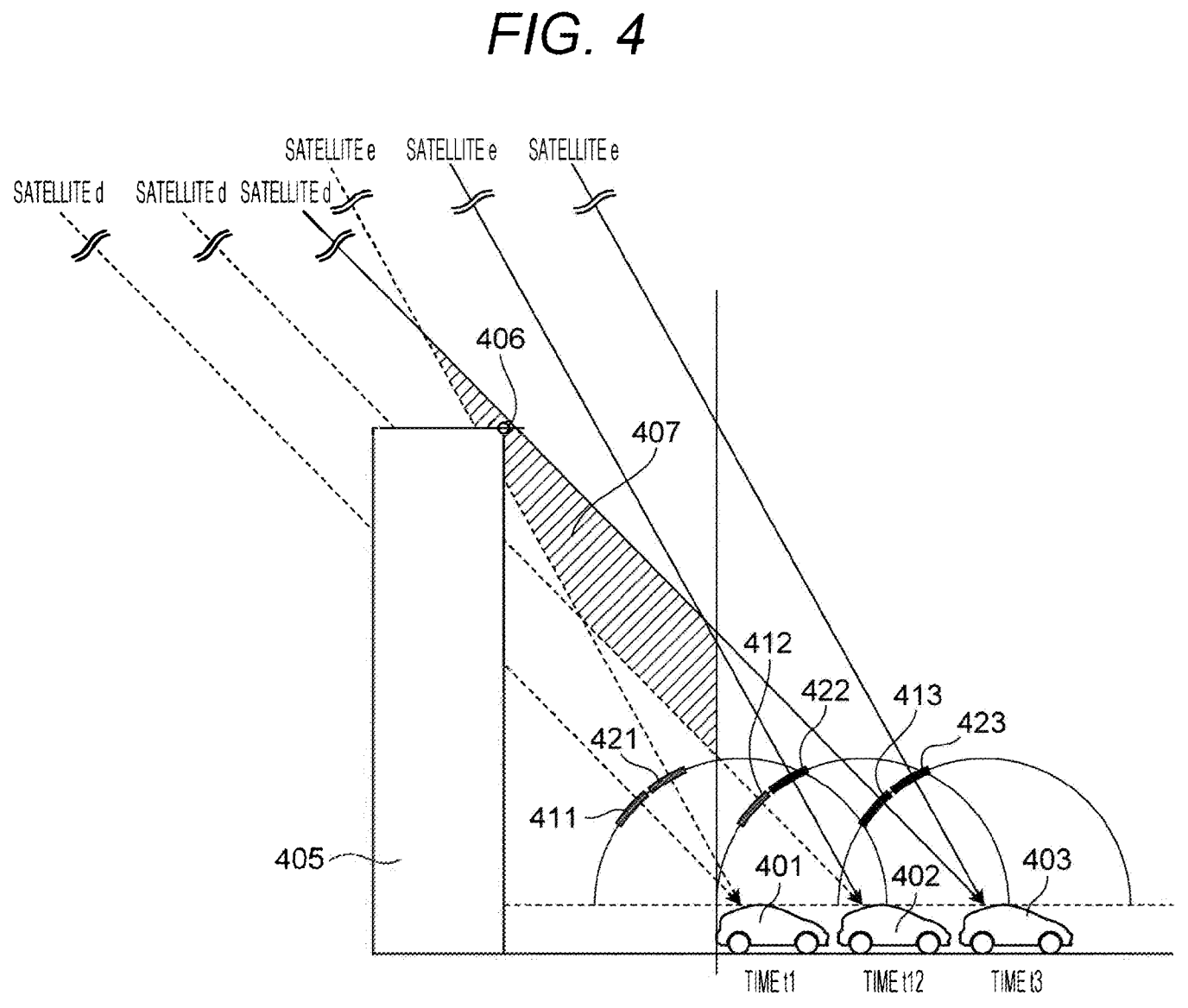

In addition, since the azimuth angle and the elevation angle at which there may be the satellite that cannot be used for positioning can be calculated while the host vehicle is moving, distance and position of the shielding object can also be calculated from this calculation result. This will be described with reference to FIG. 4. FIG. 4 is a schematic diagram when two positioning satellites d and e are observed at a position 401, a position 402, and a position 403 of the host vehicle at time t1, time t2, and time t3, and it is determined whether the host vehicle is shielded by an obstacle 405. Since the positioning satellites are present at a sufficiently high altitude with respect to a ground surface plane on which the vehicle travels, it can be assumed that the elevation angle and the azimuth angle are the same from any point of the positions 401 to 403 in a short time. In addition, a solid line between the satellite d or the satellite e and the positions 401 to 403 of the host vehicle indicates an unshielded state, and a broken line indicates a shielded state. This indicates that shielded ranges are a range 411, a range 412, and a range 421, and unshielded ranges are a range 413, a range 422, and a range 423, after the predetermined margin widths are respectively set for the azimuth angle and the elevation angle described above.

At this time, a point 406 at a boundary of an area shielded by the obstacle 405 is a point close to the host vehicle or a high point, and it can be seen that this point is inside an area 407. The area 407 can be calculated to be present in the area 407 inside lines connecting the positions and the satellites from conditions that the satellite d is shielded from the position 402, the satellite e is shielded from the position 401, the satellite d is not shielded from the position 403, the satellite e is not shielded from the position 402, and it is farther than the position 401. Alternatively, for example, it is also possible to perform calculation by a method generally called volume rendering, and in a case where a space is divided into voxels, and the satellite is not shielded from a certain position, the voxels through which a straight line connecting the position and the satellite passes are recorded and accumulated, so that it is possible to obtain that the obstacle is present in the voxels that are not passed finally. Based on the boundary of the area shielded by the obstacle thus calculated, an internal area of the boundary may also be treated as the shielded area. Such a shielded area is output to the map storage unit 13 as the map.

Figure 5:
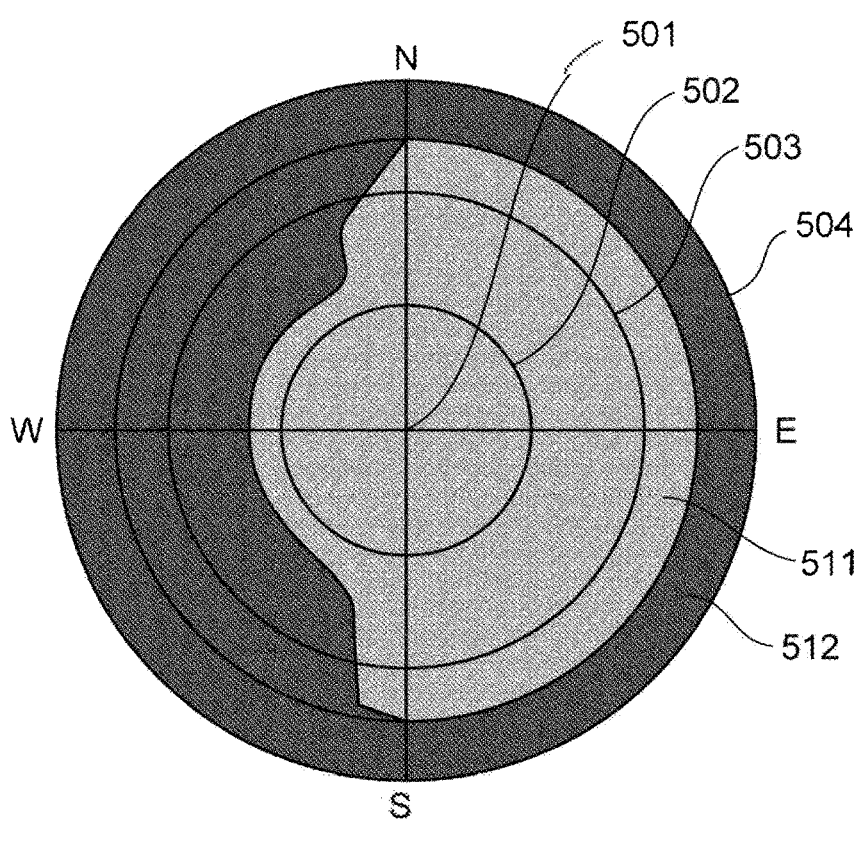
FIG. 5 is an explanatory diagram of an example expressing a shielded state recorded at each node point on a map.
Figure 5:
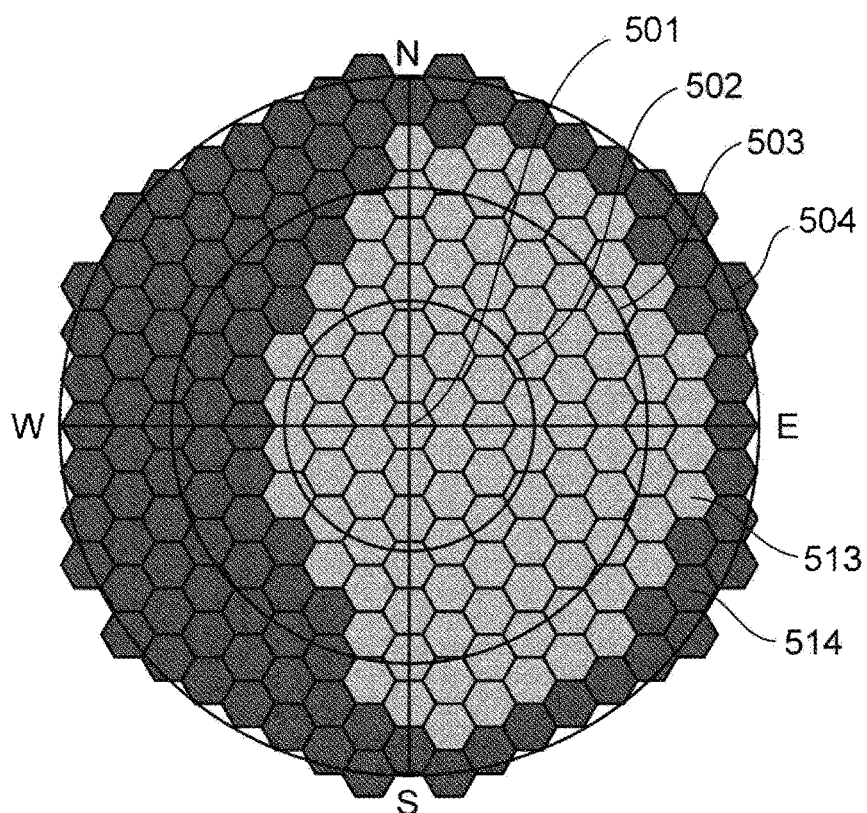

Specifically, the content to be output to the map storage unit 13 is a correspondence between each node point and the elevation angle range and the azimuth angle range in which the radio wave from the positioning satellite is shielded at a position of the node point. FIG. 5 illustrates an example. FIG. 5 illustrates the elevation angle range and the azimuth angle range in which the radio wave from the positioning satellite is shielded at a certain node point, and azimuth angles of south (S), north (N), east (E), and west (W), a reference line 501 with an elevation angle of 90 degrees, a reference line 502 with an elevation angle of 60 degrees, a reference line 503 with an elevation angle of 30 degrees, and a reference line 504 with an elevation angle of 0 degrees are drawn. With respect to this diagram of the azimuth angle and the elevation angle, a range 511 in which the radio wave from the positioning satellite is not shielded and a range 512 in which the radio wave from the positioning satellite is shielded are illustrated in a superimposed manner.

For example, by recording a shielded state of the radio wave from the positioning satellite in association with a gray value of a pixel as an image of an appropriate size as illustrated in the upper diagram of FIG. 5, it is possible to record the shielded state of the elevation angle and the azimuth angle corresponding to coordinates of each pixel. This recording method has an advantage of high readability when viewed by a person. Alternatively, by considering a hexagonal mesh as illustrated in the lower diagram of FIG. 5 and recording the shielded state of the radio wave from the positioning satellite as a value at each mesh position, it is possible to record the shielded state of the elevation angle and the azimuth angle corresponding to each mesh position. This recording method has an advantage that bias in resolution is less likely to occur with respect to the elevation angle and the azimuth angle. Alternatively, although not illustrated, either or both of the shielded area and the unshielded area may be recorded as a polygonal area in which a plurality of pairs of the azimuth angle and the elevation angle are stored as a list. This recording method has an advantage that a data capacity for recording can be reduced. As described above, the content to be output to the map storage unit 13 may take several forms, but is not specified to any one in the present invention, and at least information corresponding to the azimuth angle and the elevation angle and information on the shielded state are recorded for each node point.

<Used Satellite Selection Unit 107>

The used satellite selection unit 107 selects a signal of the positioning satellite to be used for the positioning calculation on the basis of the output from the host vehicle position receiving unit 101 and the map relating to the shielded space obtained from the satellite orbit information acquisition unit 103 and the map storage unit 13. Based on the arrangement of the positioning satellites acquired from the satellite orbit information acquisition unit 103, the azimuth angle and the elevation angle of each positioning satellite viewed from the host vehicle position acquired from the host vehicle position receiving unit 101 are calculated, and it is determined whether the observation can be performed without being shielded using the map representing the shielded area or the unshielded area generated by the map generation unit 106, thereby identifying an unshielded positioning satellite. In this way, information for identifying the positioning satellite, such as a satellite type (also referred to as a satellite system identifier or the like) and a satellite number (also referred to as a PRN number, a slot number, or the like) of the unshielded positioning satellite is output.

Note that, although the above description describes that information of the unshielded positioning satellite is output, as an output format, information of a shielded positioning satellite may be output conversely, or all satellites may be output with information indicating whether they are shielded or not. That is, the used satellite selection unit 107 in the present invention has a function of generating information that can identify which positioning satellite should be used in the subsequent stage.

<Positioning Arithmetic Unit 108>

The positioning arithmetic unit 108 performs the positioning calculation on the unshielded positioning satellite obtained from the used satellite selection unit 107 by using the pseudo distance obtained from the pseudo distance acquisition unit 102 and the satellite orbit information obtained from the satellite orbit information acquisition unit 103. The result of the positioning calculation includes one or more of latitude, longitude, altitude, time, moving speed, and moving direction, and the positioning arithmetic unit 108 outputs the result of the positioning calculation to an outside of the map processing device. This output may be used in an automatic driving device or the navigation device 11. Note that, in the above-described positioning calculation, for example, in a case where there are four or more positioning satellites, it is possible to calculate a position of a receiving station by using the least squares method, and details of a positioning calculation technique are not described herein because there are many known techniques.

<Communication Device 14>

The communication device 14 has a function of transmitting and receiving the contents of the map storage unit 13 to and from a server via a communication line as necessary. Thus, information on the surrounding shielding environment observed by the host vehicle traveling is accumulated in the server, and a map for a wide range of traveling environment can be handled regardless of restriction of storage capacity of the map storage unit 13. In addition, information on the shielding environment observed by another vehicle can be obtained via the server, and the information on the shielding environment can be used even in an environment where the host vehicle travels for the first time.

An output from the positioning arithmetic unit 108 described above is performed in accordance with an output timing of the GNSS receiver 12 although there is a delay corresponding to various processing times. Since the GNSS receiver 12 periodically acquires positioning information such as the GNSS at about 2 Hz, for example, the positioning arithmetic unit 108 can also be expected to output the positioning information at a constant cycle. In the automatic driving system, since it is necessary to always acquire where the host vehicle is traveling, the configuration of this embodiment can meet the needs of such an automatic driving system.

As described above, according to the map processing device and a map processing method of the present invention, it is possible to reduce the error in the measured position and improve the accuracy of the self-position estimation by learning at each point a state in which the positioning radio waves are affected by the structure, and it is possible to further efficiently reduce the error in the measured position and improve the accuracy of the self-position estimation by communicating with the server or the like to mutually use learning results of other vehicles traveling.

Next, processing contents of each unit according to this embodiment will be described using a flowchart as necessary.

<Processing Contents of Host Vehicle Position Receiving Unit 101>

The host vehicle position receiving unit 101 has a function of predicting the future travel position based on the travel route received from the navigation device 11 and the current location point, and calculating the arrival time or expected arrival time for the node point through which the host vehicle may pass in the future, and a function of outputting the current location point, the node point data, and the time to the positioning available satellite verification unit 104 or the used satellite selection unit 107.

In the navigation device 11, a departure point and a destination point are set in advance, and the travel route between the points is calculated, and further usually a speed limit and the like on each road are also recorded in the map in many cases, and thus the host vehicle position receiving unit 101 receives these pieces of information, and calculates a travel time t as t=d/v on the basis of, for example, a distance d between the node points and a speed limit v, and sequentially adds them to obtain a passing time of each node point.

<Processing Contents of Pseudo Distance Acquisition Unit 102>

The pseudo distance acquisition unit 102 has a function of acquiring the pseudo distance data from each satellite and the reception time from the GNSS receiver 12. Since this function is simple, a detailed description is omitted herein.

<Processing Contents of Satellite Orbit Information Acquisition Unit 103>

The satellite orbit information acquisition unit 103 has a function of acquiring the satellite orbit information from each satellite and the reception time from the GNSS receiver 12. Since this function is simple, a detailed description is omitted herein.

<Processing Contents of Positioning Available Satellite Verification Unit 104>

Figure 6:
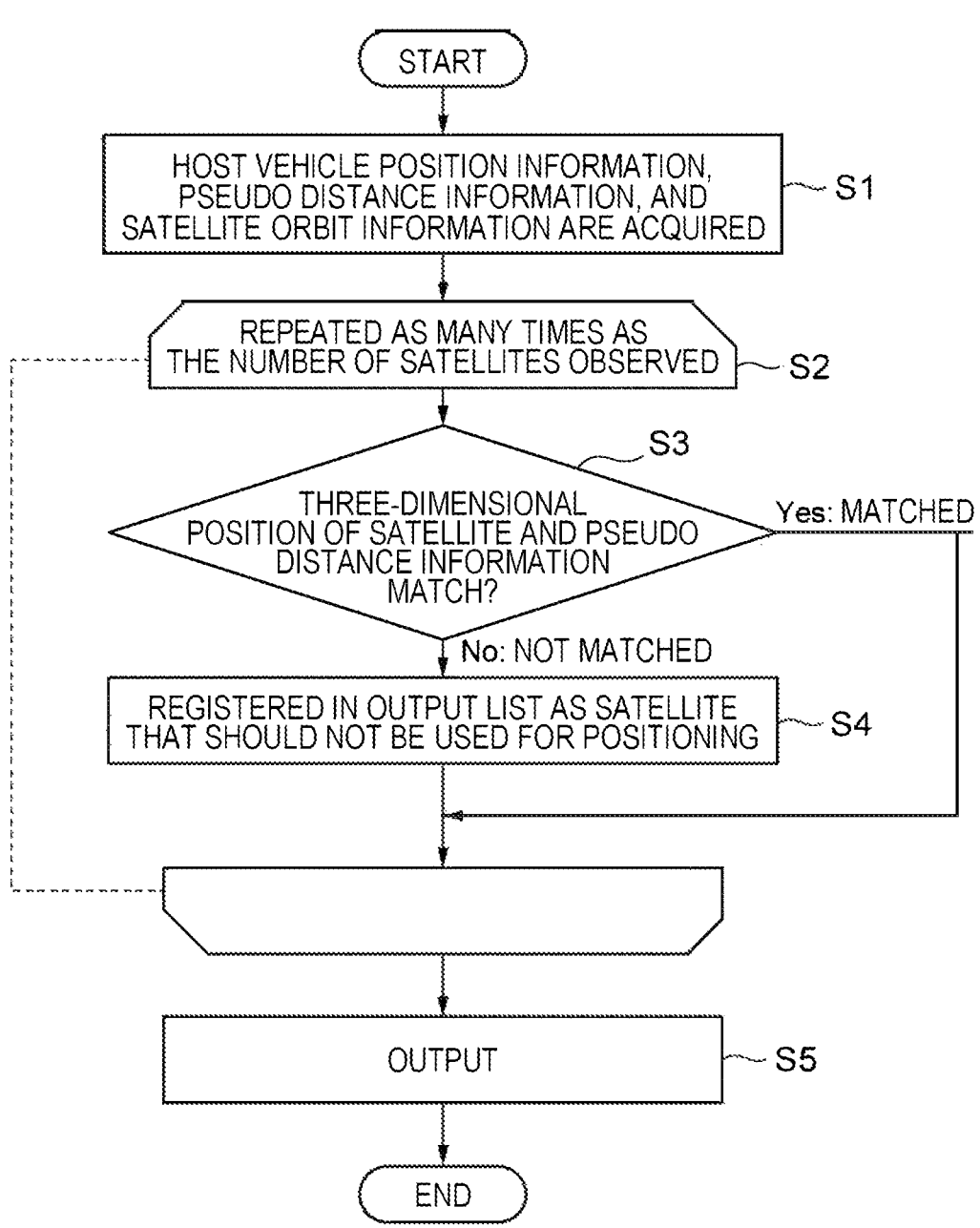
FIG. 6 is a flowchart illustrating processing contents of a positioning available satellite verification unit 104.

FIG. 6 is a flowchart illustrating the processing contents of the positioning available satellite verification unit 104.

In S1, the output from the host vehicle position receiving unit 101, the output from the pseudo distance acquisition unit 102, and the output from the satellite orbit information acquisition unit 103 are acquired and stored in the memory. Here, it is assumed that the information that has been acquired is synchronized in time.

In S2, processing of S3 and S4 are repeated as many times as the number of satellites from which the output is obtained, that is, as many times as the number of positioning satellites from which the pseudo distance can be obtained and the satellite orbit information can be obtained.

In S3, it is determined whether the position information of each positioning satellite and the pseudo distance information match the host vehicle position information. As this determination condition, a plurality of measures can be considered, and for example, determination can be made by the following method.

<Determination by Error Amount of Pseudo Distance>

A spherical surface having a distance based on the pseudo distance is considered with the three-dimensional position of the satellite as the center, and if the spherical surface passes through a range within a predetermined threshold from the host vehicle position, it is determined that it is matched, and if not, it is determined that it is not matched. Here, when the pseudo distance is converted into the actual distance, for example, in a case where ionospheric activity is active, influence of a so-called ionospheric delay tends to increase, and thus a threshold of an error amount may be increased when an ionospheric parameter is large, based on the ionospheric parameter included in the radio wave from the positioning satellite.

By employing this determination method, there is an effect that determination can be made with an appropriate threshold even when the accuracy varies due to deterioration of the ionospheric environment.

<Determination Based on Intersection with Link Corresponding to Current Position>

The spherical surface having the distance based on the pseudo distance is considered with the three-dimensional position of the satellite as the center, and it is determined that the spherical surface intersects the link corresponding to the travel position of the host vehicle as a condition for determining it is matched. Note that it is not always necessary to determine whether to intersect only the link corresponding to the travel position of the host vehicle, and for example, it may be determined whether to intersect the link corresponding to the travel position of the host vehicle and one link before and after the link.

By employing this determination method, it is possible to increase sensitivity of pseudo distance error with respect to the positioning satellite in a direction orthogonal to a travel direction of the host vehicle, that is, the positioning satellite in the sky on the left and right in the travel direction of the host vehicle, and it is possible to make strict the determination of whether it is matched. On the other hand, the sensitivity of the pseudo distance error can be reduced with respect to the positioning satellite in the sky forward and backward in the travel direction, and it is possible to make loose the determination of whether it is matched.

Figure 7:
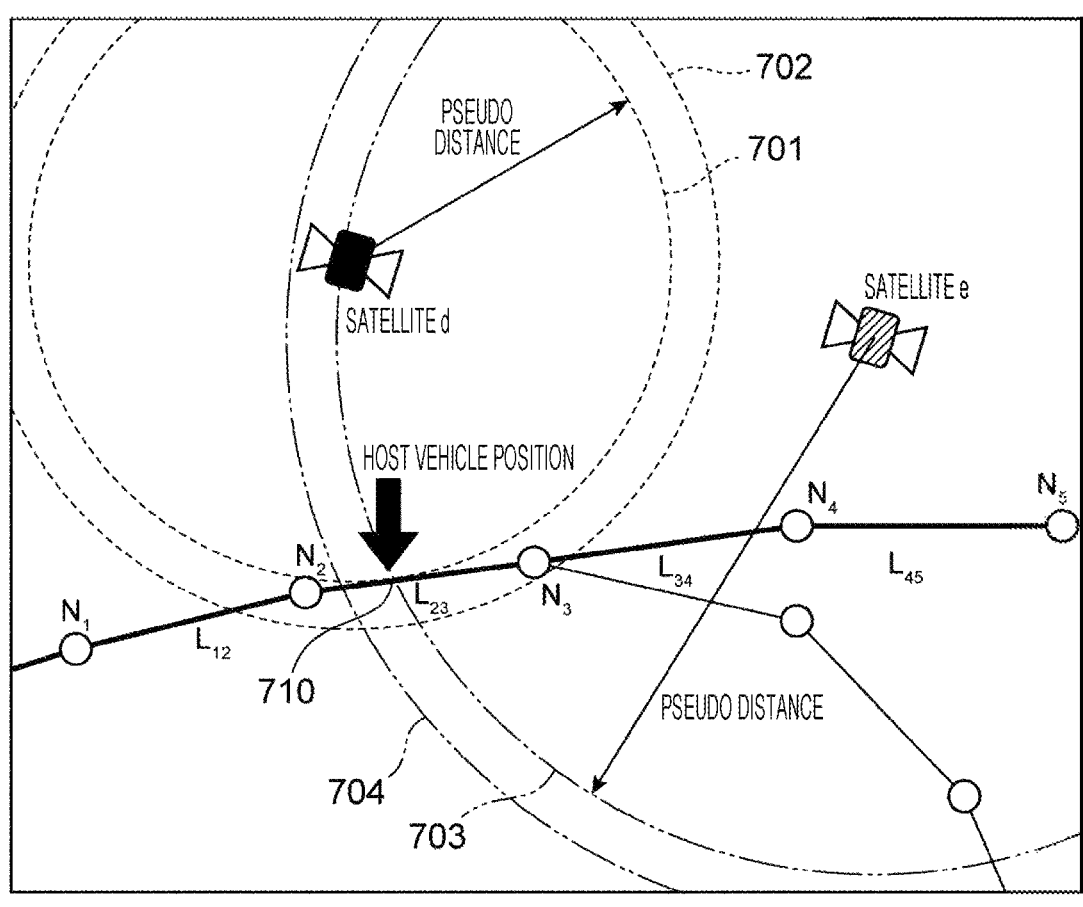
FIG. 7 is an explanatory diagram for explaining error sensitivity due to a travel direction and satellite arrangement.

This will be described with reference to FIG. 7. FIG. 7 illustrates that when the positioning satellite d in the sky on the left and right in the travel direction of the host vehicle has a spherical surface 701 with the pseudo distance as the radius, the spherical surface 701 intersects the link at a host vehicle position 710, and when the positioning satellite e in the sky forward and backward in the travel direction of the host vehicle has a spherical surface 703 with the pseudo distance as the radius, the spherical surface 703 intersects the link at the host vehicle position 710. At this time, considering a spherical surface in which similar errors occur in the pseudo distances of the positioning satellite d and the positioning satellite e and the radius increases by the error, it can be seen that a spherical surface 702 having as the radius the pseudo distance after the error occurrence of the positioning satellite d in the sky on the left and right in the travel direction of the host vehicle does not intersect the link L23 at the host vehicle position, and a spherical surface 704 having as the radius the pseudo distance after the error occurrence the positioning satellite e in the sky forward and backward in the travel direction of the host vehicle intersects the link L23 at the host vehicle position. As described above, it can be seen that the sensitivity to the error is different between the positioning satellite in the direction orthogonal to the link extending in the travel direction of the host vehicle and the positioning satellite in the sky above the extension of the link extending in the travel direction of the host vehicle.

By employing this determination method, there is an effect that the determination can be made so as to reduce an error in the orthogonal direction (lateral direction) to the travel direction, which is important for the automatic driving system.

<Determination Processing when Host Vehicle Position Information is not Obtained>

In a case where the host vehicle position information is not obtained, the positioning calculation is performed using information of the positioning satellite that can be observed in order to calculate the host vehicle position. In principle, if the positioning radio waves from at least four positioning satellites are obtained, it is possible to match the position and the time. After the host vehicle position is calculated by the positioning calculation, it is determined whether the pseudo distance of each positioning satellite is matched at the predetermined threshold or less, and the pseudo distance of the positioning satellite having a large error is determined.

By employing this determination method, the determination can be made even in a case where the host vehicle position information is not obtained or even in a case where the host vehicle position receiving unit 101 is not present, and there is an effect that the configuration can be simplified.

In this way, determination processing in S3 is performed, and if it is determined that it is not matched (No: not matched), the process proceeds to S4, and if it is determined that it is matched (Yes: matched), the process returns to beginning of repetitive processing in S2.

In S4, the satellite type, the satellite number, and the like of the satellite are registered in an output list in order to output the satellite as a satellite that should not be used for positioning.

In S5, the contents registered in the output list are output to the map generation unit 106 in the subsequent stage.

<Processing Contents of Map Generation Unit 106>

The map generation unit 106 has a function of determining that the satellite direction is shielded from the host vehicle position for the satellite determined by the positioning available satellite verification unit 104 to be unavailable for positioning, and further has the function of generating the map relating to the shielded space and outputting the map to the map storage unit 13. Since this operation has already been described with reference to FIG. 4, detailed description thereof is omitted here.

<Processing Contents of Used Satellite Selection Unit 107>

The used satellite selection unit 107 is used when determining the host vehicle position using the map stored in the map storage unit 13, and has a function of selecting the signal of the positioning satellite to be used for the positioning calculation on the basis of the map relating to the shielded space. Since the host vehicle position and each satellite position are known as three-dimensional coordinates, a difference between them can be taken to calculate the azimuth angle and elevation angle at the host vehicle position. Since this calculation method is a basic geometric operation and is a known technique, detailed description thereof is omitted here.

Furthermore, the signal of the positioning satellite to be used for the positioning calculation is selected on the basis of the map relating to the shielded space. Based on the arrangement of the positioning satellites acquired from the satellite orbit information acquisition unit 103, the azimuth angle and the elevation angle of each positioning satellite viewed from the host vehicle position acquired from the host vehicle position receiving unit 101 are calculated, and it is determined whether the observation can be performed without being shielded using the map representing the shielded area or the unshielded area generated by the map generation unit 106, thereby identifying an unshielded positioning satellite. In this way, information for identifying the positioning satellite, such as a satellite type (also referred to as a satellite system identifier or the like) and a satellite number (also referred to as a PRN number, a slot number, or the like) of the unshielded positioning satellite is output.

<Processing Contents of Positioning Arithmetic Unit 108>

The positioning arithmetic unit 108 performs the positioning calculation on the unshielded positioning satellite obtained from the used satellite selection unit 107 by using the pseudo distance obtained from the pseudo distance acquisition unit 102 and the satellite orbit information obtained from the satellite orbit information acquisition unit 103. In this positioning calculation, for example, in a case where there are four or more positioning satellites, it is possible to calculate the position of the receiving station by using optimization calculation such as the least squares method. Further, since radio field intensity of each positioning signal is also normally obtained, it can be considered that a positioning signal from the positioning satellite having a high radio field intensity is a signal that is not affected by shielding, reflection, diffraction, and the like, and thus weighted optimization calculation may be performed in which the higher the radio wave intensity, the higher the weight. Furthermore, since the positioning signal from the positioning satellite present at the azimuth angle and the elevation angle away from a boundary of the shielded area generated by the map generation unit 106 can be considered as the signal that is not affected by shielding, reflection, diffraction, and the like, the weighted optimization calculation may be performed in which the higher the radio wave intensity, the higher the weight. The details of the positioning calculation technique including the optimization calculation are not described herein because there are many known techniques.

As described above, according to the map processing device and the map processing method of this embodiment, it is possible to reduce the error in the measured position and improve the accuracy of the self-position estimation by learning at each point the state in which the positioning radio waves are affected by the structure, and it is possible to further efficiently reduce the error in the measured position and improve the accuracy of the self-position estimation by communicating with the server or the like to mutually use the learning results of the other vehicles traveling.

The satellite positioning by the GNSS uses the arrival times of the positioning radio waves from a large number of positioning satellites, and one of factors of a position error is that a positioning radio wave (multipath radio wave) having an arrival distance longer than a linear distance due to the influence of shielding, diffraction, and reflection is used for positioning calculation in addition to a positioning radio wave directly arriving from the positioning satellite to the GNSS receiver. According to the map processing device and the map processing method of this embodiment, it is possible to exclude the positioning radio wave other than the positioning radio wave that has directly arrived from the positioning calculation and improve the accuracy of the self-position estimation by learning at each point the state in which the positioning radio waves are affected by the structure.

Second Embodiment

Figure 8:
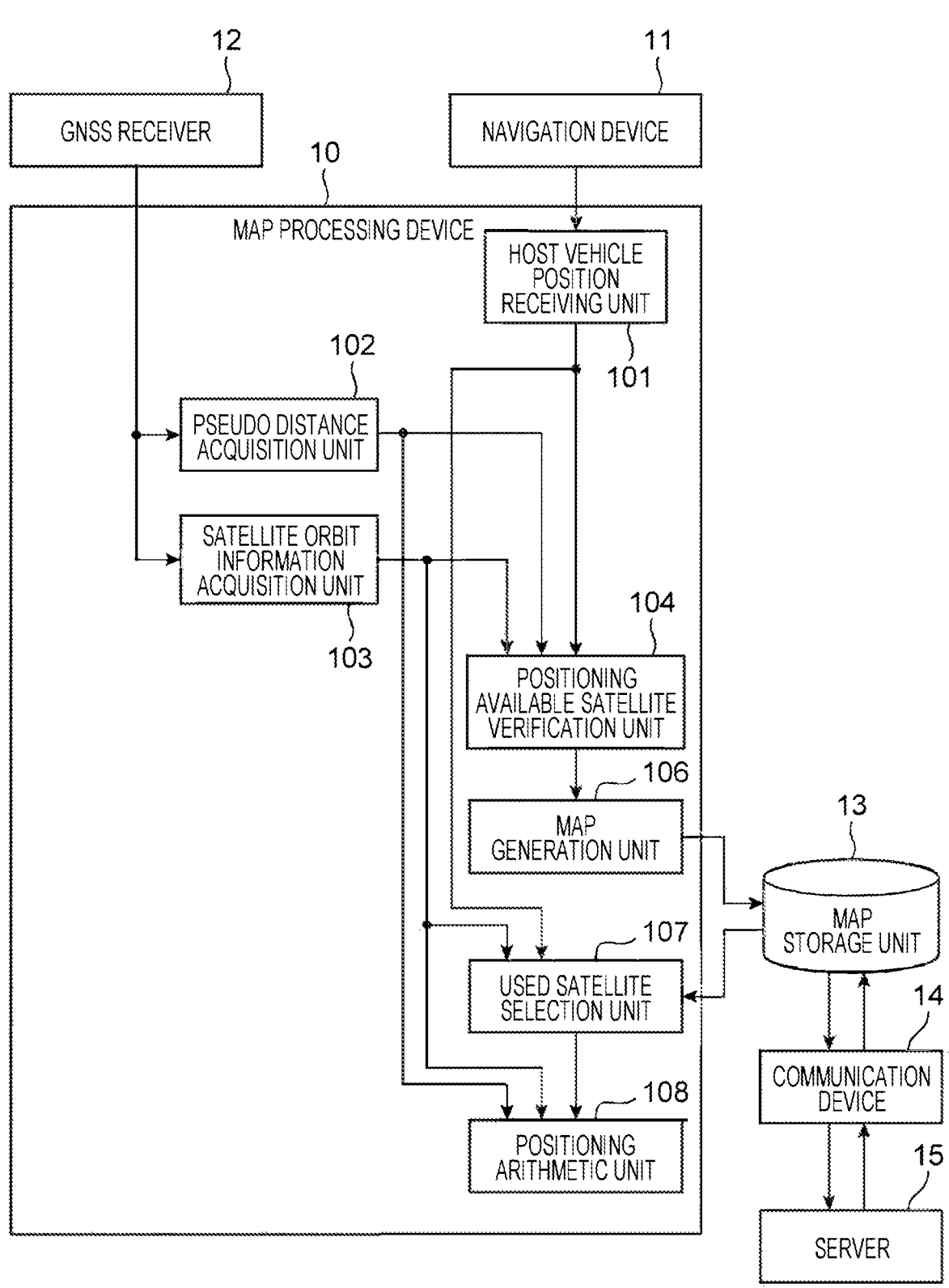
FIG. 8 is a block diagram illustrating a map processing device 10 according to Example 2 of the present invention.

FIG. 8 is a block diagram illustrating the map processing device 10 according to a second embodiment of the present invention.

The map processing device 10 is connected to the navigation device 11, the GNSS receiver 12, and the map storage unit 13, and can transmit and receive the contents of the map storage unit 13 to and from a server 15 via the communication device 14. In this embodiment, attention is paid to a state in which the map processing device 10 operates in cooperation with the server 15. Note that the server 15 is intended as a processing device capable of transmitting and receiving information to and from the communication device 14 through a communication line or the like, and does not indicate a form of hardware such as a so-called personal computer or an embedded information device. Hereinafter, details of each part will be described while appropriately omitting a portion overlapping with the first embodiment.

The host vehicle position receiving unit 101, the pseudo distance acquisition unit 102, the satellite orbit information acquisition unit 103, and the positioning available satellite verification unit 104 in this embodiment are similar to those described in the first embodiment, and thus description thereof is omitted.

<Map Generation Unit 106>

The map generation unit 106 has a function of determining that the satellite direction is shielded from the host vehicle position for the satellite determined by the positioning available satellite verification unit 104 to be unavailable for positioning, and further has a function of generating a map relating to a shielded space and outputting the map to the map storage unit 13.

At this time, as described in the first embodiment, whether the satellite can be used for positioning is output from the positioning available satellite verification unit 104, and for example, for the satellite that cannot be used for positioning, the azimuth angle and the elevation angle of the satellite can be calculated from the output from the satellite orbit information acquisition unit 103. However, the calculated elevation angle depends on a GNSS antenna height of the vehicle performing the observation. That is, since the GNSS antenna height is different between a small light vehicle and a large truck, the calculated elevation angle changes even if the same satellite is observed at the same point. Since the antenna height of the host vehicle is known, the elevation angle of the satellite is calculated from, for example, a position obtained by adding the antenna height to elevation of the travel point in consideration of a height position of the antenna when calculating the elevation angle.

The determination method of shielding, the method of providing the margin width, the method of recording the shielded area, and the like have been described in the first embodiment, and thus description thereof is omitted here.

However, it is assumed that information on the antenna height or division of the antenna height such as a small vehicle, a standard vehicle, a large vehicle, or the like, index information indicating reliability of the observation information, and observation time information are also added to the content to be output to the map storage unit 13. That is, for each node point, at least the information corresponding to the azimuth angle and the elevation angle, the information on the shielded state, the antenna height, the division of the antenna height, the reliability index of the output information, and the time information are recorded.

Note that if the map processing device of the present invention is an automobile manufacturer option, it is assumed that the GNSS antenna height is already set at the time of shipment, but if the map processing device is an accessory as a dealer option or purchased later, it is necessary to set the mounting position of the GNSS antenna. FIG. 9 illustrates an example of a method of setting the mounting position of the GNSS antenna.

FIG. 9 is a schematic diagram illustrating an example of a setting screen displayed on a display device connected to the host vehicle (not illustrated).

As this display device, a navigation device, a smartphone, or a tablet terminal may be used, and further, selection input or numerical value input can be performed by a touch panel or switches in cooperation with the display device. A setting screen 901 is an example of a screen on which the antenna height and left and right positions of the antenna can be input and adjusted in centimeters. Here, an input field for a front and rear direction is omitted, and it is because an attachment position does not significantly affect performance because the travel direction changes from moment to moment during traveling, however, an input field for the front and rear direction may be provided. On a setting screen 902, the antenna height can be selected from a vehicle type, and an input of deviation in a left and right direction can also be selected in about 5 stages. With such a setting screen configuration, there is an effect that a setting input can be simplified and burden on a user can be reduced.

As for the reliability index of the output information, in the case of the dealer option or the accessory purchased later, there is a possibility that an error of the output information is large, for example, there is an error in setting of the attachment position, or the accuracy is reduced because an inexpensive antenna is used, and thus the reliability index is made lower than that in the case of the manufacturer option. In addition, for example, by using a GNSS antenna with more frequencies or a plurality of GNSS antennas as in a surveying vehicle or the like, it is possible to improve the accuracy of the output information such that an error of the ionospheric delay can be reduced and a positioning radio wave affected by reflection or diffraction can be excluded, and thus the reliability index is increased according to characteristics of the antenna to be used. FIG. 10 illustrates a setting example of reliability indexes. As illustrated in this figure, the reliability index varies depending on whether it is the accessory as the dealer option or purchased later, the manufacturer option, or the surveying vehicle. In addition, even in the manufacturer option, the reliability index may also be set different for each car manufacturer depending on whether it is an inexpensive vehicle type or an expensive vehicle type.

<Used Satellite Selection Unit 107>

The used satellite selection unit 107 selects the signal of the positioning satellite to be used for the positioning calculation on the basis of the output from the host vehicle position receiving unit 101, the map relating to the shielded space obtained from the satellite orbit information acquisition unit 103 and the map storage unit 13, and the GNSS antenna height of the vehicle that created the map. Based on the arrangement of the positioning satellites acquired from the satellite orbit information acquisition unit 103, the azimuth angle and the elevation angle of each positioning satellite viewed from the host vehicle position acquired from the host vehicle position receiving unit 101 are calculated, and it is determined whether each positioning satellite can be observed without being shielded by converting the map representing the shielded area or the unshielded area generated by the map generation unit 106 using a difference between the GNSS antenna height when the map is generated and the GNSS antenna height of the host vehicle, thereby identifying the unshielded positioning satellite. In this way, the information for identifying the positioning satellite, such as the satellite type and the satellite number of the unshielded positioning satellite is output.

<Communication Device 14>

Since the positioning arithmetic unit 108 and the communication device 14 are similar to those described in the first embodiment, the description thereof is omitted.

<Server 15>

The server 15 receives the contents of the map storage unit 13 transmitted from the communication device 14, for example, for each node point, at least the information corresponding to the azimuth angle and the elevation angle, the information on the shielded state, the antenna height, the division of the antenna height, the reliability index of the output information, and the time information. The server 15 accumulates at least the information corresponding to the azimuth angle and the elevation angle and the information on the shielded state for each node point, and updates the information as necessary. For this update, at least one or both of the reliability index and the time information are used.

Specifically, if there is no information maintained on the server 15 regarding the shielded state of a certain node point, the received shielded state is directly stored. When the shielded state different from the already stored shielded state is received, if the observed time information is new and the reliability index is high, the shielded state is updated with the received shielded state and stored, and if not, the stored shielded state is held. This will be described with reference to FIG. 11.

Figure 11:
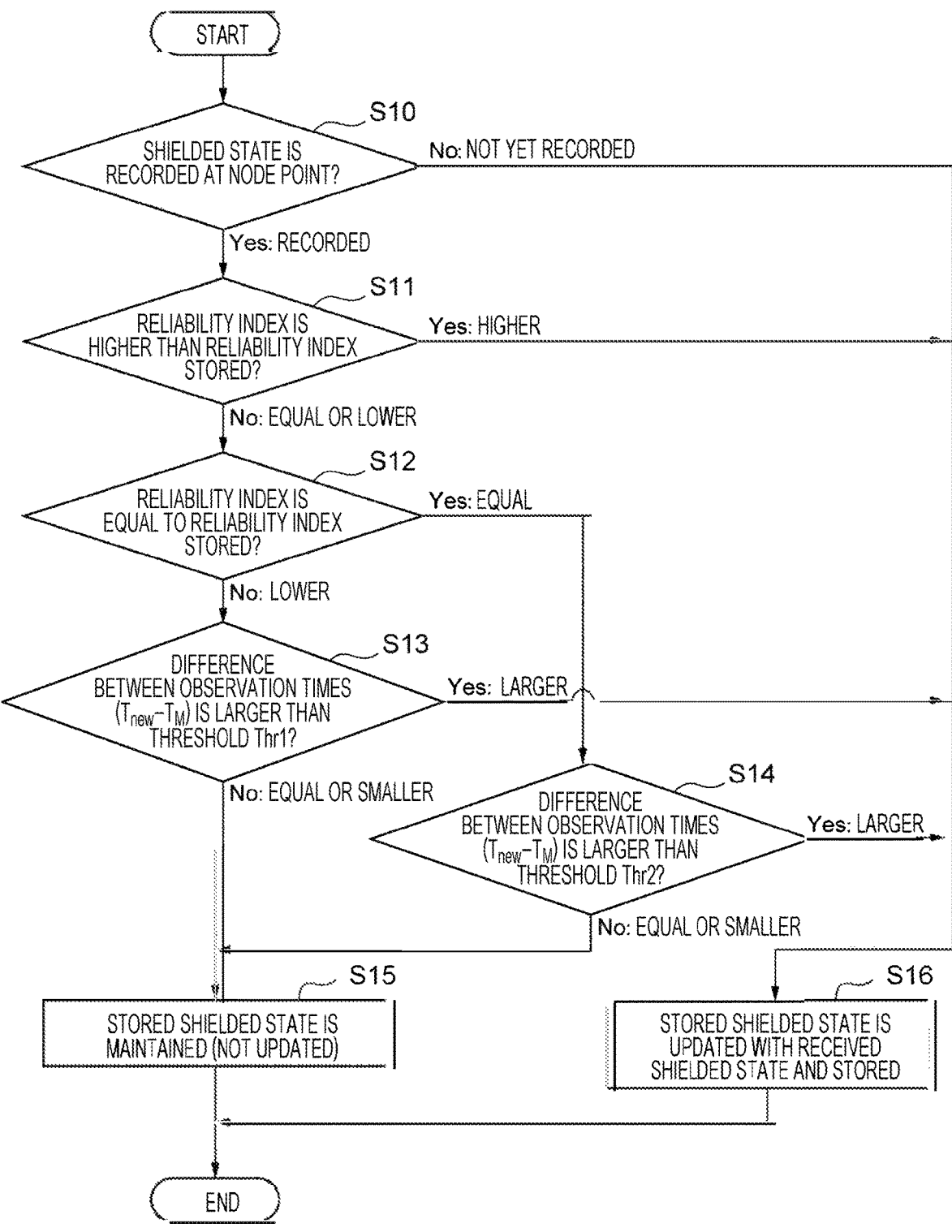
FIG. 11 is a flowchart of processing of storing or updating the shielded state for a certain node point on a server.

FIG. 11 is a flowchart of processing of storing or updating the shielded state for a certain node point on the server 15. Note that it is assumed that a reliability index $C_{new}$ newly observed at a time $T_{new}$ is received from the communication device 14.

In S10, it is determined whether the shielded state has already been recorded at the node point. If the data is recorded (Yes), the process proceeds to S11, and if the data is not recorded (No), the process proceeds to S16. If it is recorded, in S11, compared with a reliability index $C_M$ at an observation time $T_M$ of the shielded state already stored, it is determined whether the newly observed reliability index $C_{new}$ is higher than the reliability index $C_M$. If it is higher (Yes), the process proceeds to S16, and if it is equal to or lower (No), the process proceeds to S12. In S12, it is determined whether the reliability index $C_{new}$ is equal to the stored reliability index $C_M$. If it is equal to (Yes), the process proceeds to S14, and if it is lower (No), the process proceeds to S13. In S13, it is determined whether a difference between observation times ($T_{new}$-$T_M$) is larger than a threshold Thr1. If it is larger than the threshold (Yes), the process proceeds to S16, and if it is equal to or lower than the threshold (No), the process proceeds to S15. In S14, it is determined whether the difference between the observation times ($T_{new}$-$T_M$) is larger than a threshold Thr2. If it is larger than the threshold (Yes), the process proceeds to S16, and if it is equal to or lower than the threshold (No), the process proceeds to S15.

In S15, since the shielded state newly observed at the time $T_{new}$ and received with the reliability index $C_{new}$ from the communication device 14 is older than the already stored shielded state or is not higher in reliability than the already stored shielded state, it is determined that the shielded state is not worth updating, and as a result, the stored shielded state is maintained and not updated. On the other hand, in S16, the stored shielded state is updated with the received shielded state and stored.

Thus, by updating the map on the server 15 side, it is possible to keep holding the latest and highly reliable map.

The map on the server 15 side is reflected in the map storage unit 13 via the communication device 14, for example, in response to an update request from the map processing device 10. Alternatively, the map on the server 15 side is reflected in the map storage unit 13 via the communication device 14 in response to an update request from the server 15. The update request from the map processing device 10 is issued, for example, when certain conditions have been met, such as when the map processing device 10 is activated for the first time, when the host vehicle travels in the area for the first time, when the user issues the update request, or when a certain period of time has elapsed since a previous update. The update request from the server 15 is issued, for example, when certain conditions have been met, such as when the certain period of time has elapsed since the previous update, or when a map of a predetermined range or more is updated in a vehicle with high reliability such as the surveying vehicle.

As described above, according to the map processing device and a map processing method of the present invention, it is possible to reduce the error in the measured position and improve the accuracy of the self-position estimation by learning at each point a state in which the positioning radio waves are affected by the structure, and it is possible to further efficiently reduce the error in the measured position and improve the accuracy of the self-position estimation by communicating with the server or the like to mutually use learning results of other vehicles traveling.

Although the embodiments of the present invention have been described in detail above, the present invention is not limited to the above embodiments, and various design changes can be made without departing from the spirit of the present invention described in the claims. For example, the above-described embodiments have been described in detail for easy understanding of the present invention, and are not necessarily limited to those having all described configurations. Further, a part of configuration of a certain embodiment can be replaced with a configuration of another embodiment, and a configuration of another embodiment can be added to a configuration of a certain embodiment. Furthermore, it is possible to add, delete, or replace another configuration for a part of configuration of each embodiment.

REFERENCE SIGNS LIST

10 map processing device
11 navigation device
12 GNSS receiver
13 map storage unit
14 communication device
101 host vehicle position receiving unit
102 pseudo distance acquisition unit
103 satellite orbit information acquisition unit
104 positioning available satellite verification unit
106 map generation unit
107 used satellite selection unit
108 positioning arithmetic unit
201 shoulder division line
202 travel path division
211, 212 travel path
221, 222, 223 travel path
$N_{L1}$, $N_{L2}$, $N_{L3}$, $N_{L4}$, $N_{L5}$ left travel path node point
$N_{R1}$, $N_{R2}$, $N_{R3}$, $N_{R4}$, $N_{R5}$ right travel path node point
$N_{S4}$, $N_{S5}$ side road node point
$P_a$, $P_b$, $P_c$ pseudo distance of satellite a, satellite b, and satellite c
401, 402, 403 host vehicle position at time t1, time t2, and time t3
405 obstacle
406 boundary point of area shielded by obstacle
407 area where boundary point of shielded area may be present
411 shielded area in azimuth angle and elevation angle directions of satellite d at time t1
412 shielded area in azimuth angle and elevation angle directions of satellite d at time t2
413 unshielded area in azimuth angle and elevation angle directions of satellite d at time t3
421 shielded area in azimuth angle and elevation angle directions of satellite e at time t1

422 unshielded area in azimuth angle and elevation angle directions of satellite e at time t2

423 unshielded area in azimuth angle and elevation angle directions of satellite e at time t3

501 reference point in zenith direction (elevation angle: 90 degrees)

502 reference line with elevation angle of 60 degrees

503 reference line with elevation angle of 30 degrees

504 reference line of horizontal line (elevation angle: 0 degrees)

511 unshielded area

512 shielded area

513 unshielded area

514 shielded area

701 line in which spherical surface with satellite d as center and pseudo distance as radius intersects ground surface plane

702 line in which spherical surface with satellite d as center and (pseudo distance+error) as radius intersects ground surface plane

703 line in which spherical surface with satellite e as center and pseudo distance as radius intersects ground surface plane

704 line in which spherical surface with satellite e as center and (pseudo distance+error) as radius intersects ground surface plane

710 host vehicle position

The invention claimed is:

1. A map processing device that processes map information used for positioning a host vehicle, the map processing device comprising:

a satellite orbit information acquisition unit that acquires position information of a plurality of positioning satellites;

a pseudo distance acquisition unit that calculates a pseudo distance between the plurality of positioning satellites and a host vehicle position based on positioning radio waves respectively received from the plurality of positioning satellites;

a positioning available satellite verification unit that identifies, among the plurality of positioning satellites, a positioning satellite for which a distance to the host vehicle position and the pseudo distance do not match as a positioning unavailable satellite that cannot be used for positioning the host vehicle;

a map generation unit that generates a map in which a direction from the host vehicle position to the positioning unavailable satellite is stored in association with the host vehicle position as a shielded range in which a positioning radio wave from the positioning unavailable satellite is shielded, wherein the map generation unit stores an azimuth angle and an elevation angle from the host vehicle position toward the positioning unavailable satellite in association with the host vehicle position as an azimuth angle and an elevation angle at which the positioning radio wave from the positioning unavailable satellite is shielded;

a host vehicle position information acquisition unit that acquires host vehicle position information of the host vehicle;

a travel route acquisition unit that acquires a travel route of the host vehicle; and a map communication unit that receives and transmits the map generated by the map generation unit via a communication line;

wherein the map generation unit estimates the azimuth angle at which the positioning radio wave from the positioning unavailable satellite is shielded, from a position of the positioning unavailable satellite and the host vehicle position on the travel route, estimates the elevation angle from a position obtained by adding an antenna height of the host vehicle to the host vehicle position, and generates the map in which a shielded state, a reliability index of the shielded state, and an observation time at which the shielded state is observed are recorded for each node point of the map; and wherein the map communication unit receives the map in which the shielded state, the reliability index, and the observation time are recorded via the communication line for each node point of the map.

2. The map processing device according to claim 1, wherein the positioning available satellite verification unit calculates a distance between the plurality of positioning satellites and the host vehicle position as a calculated distance on the basis of the position information of the plurality of positioning satellites and position information of the host vehicle, and identifies, as the positioning unavailable satellite, a positioning satellite in which a difference between the calculated distance and the pseudo distance is equal to or larger than a threshold.

3. The map processing device according to claim 1, comprising a used satellite selection unit that switches positioning satellites used for position estimation of the host vehicle at positioning points to be traveled based on the map generated by the map generation unit.

4. The map processing device according to claim 1, wherein the positioning available satellite verification unit determines that the host vehicle and the positioning satellite are in a visible positional relationship when a difference between a distance connecting the host vehicle position and a position of the positioning satellite and the pseudo distance is within a predetermined error range.

5. A map processing method in an automatic driving system that travels while performing satellite positioning using positioning radio waves received from a plurality of positioning satellites, the map processing method comprising:

a pseudo distance acquisition step of calculating a pseudo distance to each satellite;

a satellite orbit information acquisition step of acquiring position information of each satellite;

a host vehicle position information acquisition step of acquiring host vehicle position information;

a positioning available satellite verification step of determining whether a pseudo distance to each satellite matches a host vehicle position;

a map generation step of generating a map on the basis of a determination result in the positioning available satellite verification step, wherein an azimuth angle and an elevation angle from the host vehicle position toward the positioning unavailable satellite are stored in association with the host vehicle position as an azimuth angle and an elevation angle at which the positioning radio wave from the positioning unavailable satellite is shielded;

a host vehicle position information acquisition step of acquiring host vehicle position information of the host vehicle;

a travel route acquisition step of acquiring a travel route of the host vehicle; and a map communication step of receiving and transmitting the map via a communication line;

wherein the map generation step includes estimating the azimuth angle at which the positioning radio wave from the positioning unavailable satellite is shielded, from a position of the positioning unavailable satellite and the host vehicle position on the travel route, estimating the elevation angle from a position obtained by adding an antenna height of the host vehicle to the host vehicle position, and generating the map in which a shielded state, a reliability index of the shielded state, and an observation time at which the shielded state is observed are recorded for each node point of the map; and wherein the map communication step includes receiving the map in which the shielded state, the reliability index, and the observation time are recorded via the communication line for each node point of the map.

\* \* \* \* \*